United States Patent [19]

Schatteman

[11] Patent Number: 4,510,591
[45] Date of Patent: Apr. 9, 1985

[54] SLOT TYPE DISC RECORDER AND/OR PLAYER APPARATUS

[75] Inventor: Etienne A. Schatteman, Wemmel, Belgium

[73] Assignee: Staar S.A., Brussels, Belgium

[21] Appl. No.: 441,923

[22] Filed: Nov. 15, 1982

[30] Foreign Application Priority Data

Dec. 10, 1981 [BE] Belgium .............................. 891428

[51] Int. Cl.³ .................... G11B 17/04; G11B 19/16
[52] U.S. Cl. ................................................. 369/77.1
[58] Field of Search ...................................... 369/77.1

[56] References Cited

U.S. PATENT DOCUMENTS

| 3,256,024 | 6/1966 | Mason | 369/77.1 |
| 4,220,339 | 9/1980 | Coleman | 369/77.2 |
| 4,408,316 | 10/1984 | Saito | 369/77.2 |

FOREIGN PATENT DOCUMENTS

| 76583 | 4/1983 | European Pat. Off. | 369/77.1 |
| 119970 | 9/1981 | Japan | 369/77.1 |

Primary Examiner—Steven L. Stephan
Attorney, Agent, or Firm—Leydig, Voit, Osann, Mayer & Holt, Ltd.

[57] ABSTRACT

A slot type disc recorder and/or player apparatus is disclosed having a disc drive spindle and a member for supporting a disc for in-and-out sliding movement edgewise in its own plane in a transverse path relative to the spindle axis. The member has a V-shaped surface symmetrically located with respect to the spindle to support a disc for sliding movement along the path by engaging the disc only at its edges. Also disclosed is a pivotable mounting for the member for locating the path of movement so that the disc clears an end of said spindle when the disc is inserted or removed.

5 Claims, 5 Drawing Figures

SLOT TYPE DISC RECORDER AND/OR PLAYER APPARATUS

TECHNICAL FIELD

The invention relates to disc recorder and/or player apparatus and, more particularly, to such apparatus of the slot type in which a disc is inserted or removed through a slot relative to a disc drive.

BACKGROUND ART

Heretofore in slot type disc recorder and/or player apparatus, as the disc is inserted or removed it slides across members that may scratch or abrade the surface of the disc and thus damage the grooves in the disc. To avoid contact with the surface of the disc, it is desirable to engage the disc only at the edges. However, known mechanism arranged to engage the disc only at the edges during insertion and removal is complex and expensive to manufacture.

DISCLOSURE OF INVENTION

The principal object of this invention is to provide a disc recorder and/or player apparatus wherein a disc is supported for in-and-out sliding movement and is engaged only at its edges while being inserted or removed.

A related object is to provide a simple, low cost mechanism for supporting a disc for in-and-out sliding movement in a slot type disc recorder and/or player apparatus.

Another object is to provide a slot type disc recorder and/or player apparatus wherein a disc is slidably supported for movement under its own weight into operative relation with a disc drive of such an apparatus.

BRIEF DESCRIPTION OF THE DRAWINGS

Further objects will become clear from the following description taken in conjunction with the accompanying drawings, in which.

BEST MODE FOR CARRYING OUT THE INVENTION

Figure 1:
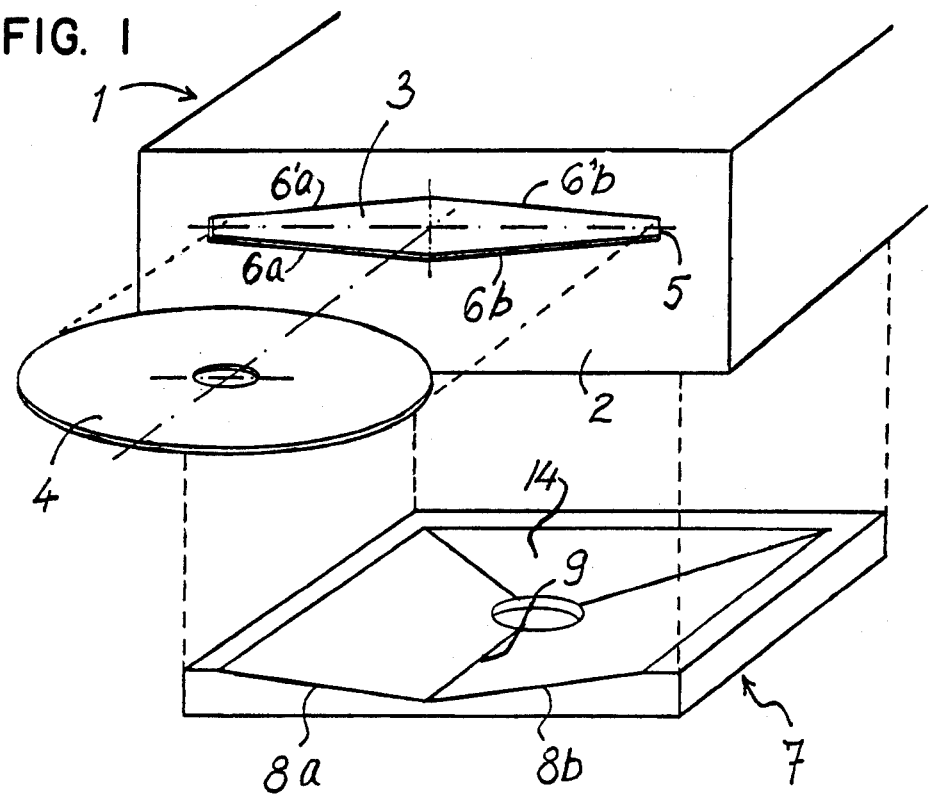
FIG. 1 is an exploded perspective view of components of a disc recorder and/or player apparatus constructed according to this invention.
Figure 1A:
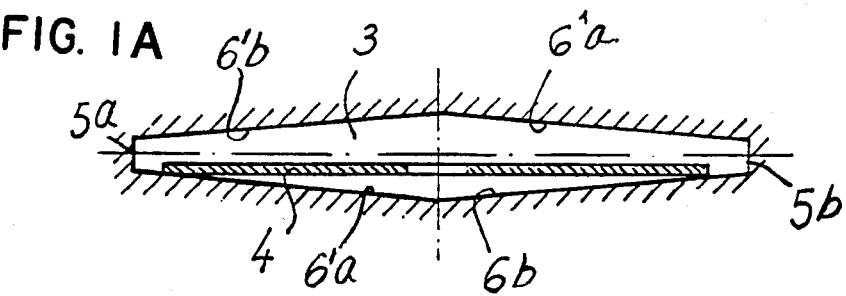
FIG. 1A is an enlarged fragmentary view illustrating the configuration of the slot in the apparatus shown in FIG. 1.

Turning now to FIG. 1, a housing 1 is shown for a disc recorder and/or player apparatus of the type particularly suited for discs having information digitally coded in grooves on one or both sides of the disc. The housing 1 has a front face 2 with a slot 3 through which a disc 4 may be inserted to be positioned on a disc drive and removed from the drive through the slot 3. As shown, the slot 3 has lateral edges 5a, 5b and bottom and top edges 6a, 6b, 6'a, 6'b and a member 7 supporting the disc for in-and-out sliding movement.

Figure 2:
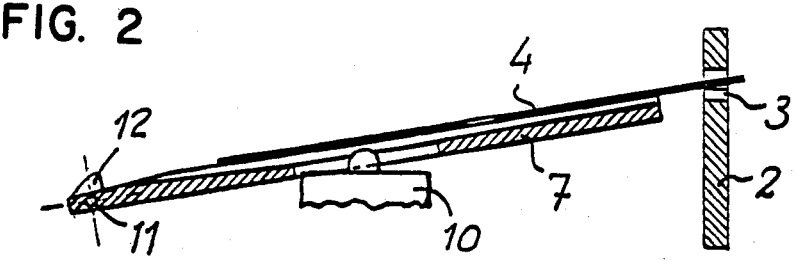
FIG. 2 is a fragmentary sectional view of the apparatus shown in FIG. 1 with the parts assembled.
Figure 3:
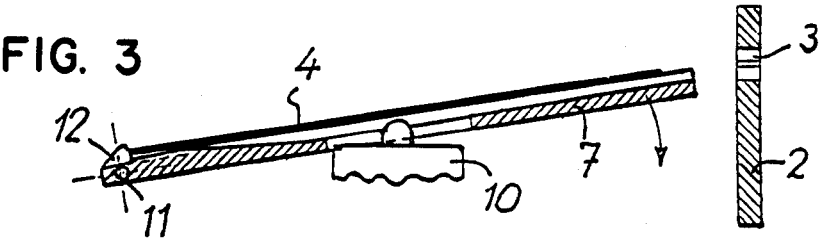
FIG. 3 is a fragmentary sectional view similar to FIG. 2 showing a disc fully inserted.
Figure 4:
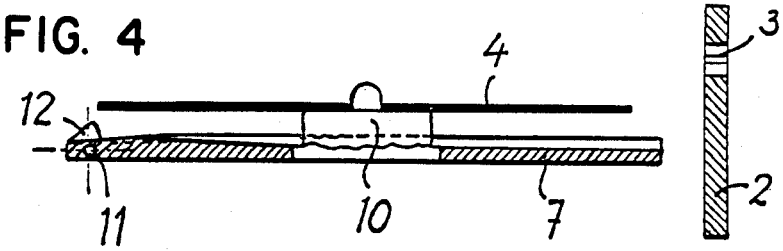
FIG. 4 is a fragmentary sectional view similar to FIG. 2 showing a disc fully inserted and in operative relation on the spindle of the disc drive of the apparatus.

Also referring to FIGS. 2-4, according to the invention, the member 7 has a V-shaped surface 8a, 8b supporting a disc for sliding movement along a path transverse to the spindle axis when the disc is inserted or removed while engaging the disc only at its lateral edges. The surfaces 8a, 8b of the support member 7 for the disc is "V-shaped" which is intended to mean of shallow, dished configuration which ideally is smoothly and continuously curved from one lateral edge to the other. However, to facilitate manufacture, the surface 8a, 8b is preferably defined by planes shown herein in FIG. 1 inclined toward each other and meetng along a line 9 which intersects the axis of the spindle 10.

To permit a disc to be moved in its own plane without interference from the spindle 10, the spindle and support member 7 are movable relatively axially of the spindle so that when the disc is being inserted or removed the top end of the spindle is below the plane of in-and-out edgewise movement of the disc. This may be achieved by having a fixed support member and an axially movable spindle or, as herein shown in FIGS. 2-4, by having a movable support member 7 which may be raised to elevate the member (as shown in FIG. 2) so that the front edge of the disc clears the top end of the spindle as the disc is inserted. To remove the disc, the support member 7 is pivoted from the position of FIG. 4 to the position of FIG. 3 or the spindle is lowered from engagement in the center hole of the disc to permit edgewise movement of the disc.

Referring again to FIG. 2, the support member 7 in this preferred embodiment of the invention is pivotably mounted about the axis 11 in the housing 1 and may be raised to an inclined loading position to maintain the disc elevated above the top end of the spindle 10 as it is inserted. The disc is manually inserted through the slot 3 in the front wall 2 of the housing 1 and is slidable under its own weight along the surface 8a, 8b of the support member 7 which is inclined downward toward the spindle in the direction of the path of inward movement of the disc until the front edge of the disc meets the abutment 12 on the support member 7. In order that the disc only be engaged at its edges while being inserted the V-shapd surface 8a, 8b of the member 7 merges into a portion 14 of the surface of the member 7 transverse to the path of inward movement and defined by a plane inclined toward the spindle 10. Thus, this portion 14 of the surface of the member 7 is inclined so as to provide clearance with the under surface of the disc except at the edges of the disc as the disc is inserted and removed.

After the disc 4 has reached its fully inserted position shown in FIG. 3, which is achieved by sliding movement of the disc under its own weight without requiring the aid of other members or human force or guidance, the member 7 is pivoted downward to lower the disc 4 to an operative position on the spindle 10. Desirably the spindle 10 and member 7 are also moved relatively axialy by raising the spindle 10 or lowering the member 7 to fully separate the disc 4 from the member 7 so that the disc 4 may be rotated when in operative position without engaging the member 7. Conventionally, the disc 4 is clamped to the spindle 10 by means not shown, which may of the type shown in copending U.S. application Ser. No. 457,360 entitled "Disk Player Having Self Activated Magnetic Clamp Device", to allow high speed rotation of the disc by the spindle.

This apparatus is particularly suited for discs of the type rotated at high speed when clamped to the spindle 10 and having grooves on the under surface of the disc which are read by laser. The apparatus of this invention is, therefore, particularly constructed to avoid contact by extraneous members with the underside of the disc as it is inserted. However, the top surface of the disc may also be provided with recording grooves containing data. Thus, the upper edges 6′a, 6′b of the slot 3 are also preferably formed by inclined planes as shown arranged symmetrically with respect to the axis of the spindle to avoid any contact between the upper edges of the slot 3 and the top surface of the disc as it is inserted or removed.

I claim:

1. In a disc recorder and/or player apparatus having a disc drive wherein a disc is rotated by a spindle,
   a support for in-and-out sliding movement of a disc in its own plane in a transverse path relative to the spindle axis, said support including a member having a V-shaped surface with first portions extending to the spindle which are smoothly inclined and substantially symmetrically located with respect to said spindle which are engaged only by the edge of the the disc during in-and-out sliding movement, and a further portion extending transverse to said path and inclined toward said spindle into which said first portions merge so as to provide clearance between the surface of a disc and the surface of said member except at the edge of the disc to support the disc at the edge for relative movement with respect to the spindle, and
   means for mounting said member and said spindle for relative movement axially of said spindle.

2. A disc support according to claim 1 wherein all said portions of said V-shaped surface of said member are defined by planes inclined toward said spindle and meeting along lines intersecting said spindle.

3. A disc support according to claim 1 wherein all said portions of said V-shaped surface of said member are curved.

4. In a disc recorder and/or player apparatus having a housing and a disc drive wherein a disc is rotated by a spindle,
   a movable support for in-and-out sliding movement of a disc in a transverse path relative to the spindle axis, said support being movable between two positions, a first position locating said path of movement so that a disc clears an end of said spindle when the disc is inserted or removed and a second position with the disc centered on said spindle and said spindle passing through a center hole in the disc, said support having a V-shaped surface with first portions extending to the spindle which are smoothly inclined and substantially symmetrically located with respect to the spindle axis which are engaged only by the edge of a disc during in-and-out sliding movement, and a further portion extending transverse to said path and inclined toward said spindle into which said first portions merge so as to provide clearance between the surface of a disc and the surface of said member except at the edge of the disc to support the disc at the edge for relative movement with respect to the spindle, and
   a fixed slot in said housing aligned with said support when in said first position through which a disc is inserted or removed relative to said support, said slot having V-shaped edges with portions smoothly inclined and arranged symmetrically with respect to said path so that contact with the slot by the disc during its insertion and ejection along said path to said support can only take place by the edge of the disc.

5. An apparatus according to claim 4 wherein said V-shaped edges of said slot and all portions of said surface of said member are continuously curved.

* * * * *